United States Patent [19]

Genrich

[11] Patent Number: 4,543,483

[45] Date of Patent: Sep. 24, 1985

[54] RADIATION MEASURING INSTRUMENT

[76] Inventor: Volker Genrich, Heerstrasse 149, D-6000 Frankfurt am Main 90, Fed. Rep. of Germany

[21] Appl. No.: 413,368

[22] PCT Filed: Dec. 22, 1981

[86] PCT No.: PCT/EP81/00203

§ 371 Date: Aug. 9, 1982

§ 102(e) Date: Aug. 9, 1982

[87] PCT Pub. No.: WO82/02456

PCT Pub. Date: Jul. 22, 1982

[30] Foreign Application Priority Data

Jan. 9, 1981 [DE] Fed. Rep. of Germany ....... 3100447

[51] Int. Cl.[4] .............................................. H01J 47/06
[52] U.S. Cl. .................................................... 250/374
[58] Field of Search ............... 250/374, 375, 388, 385; 313/93; 340/600

[56] References Cited

U.S. PATENT DOCUMENTS

| | | | |
|---|---|---|---|
| 2,679,609 | 5/1954 | Meloy | 250/374 |
| 2,736,817 | 2/1956 | Bell, Jr. | 250/388 |
| 2,974,248 | 3/1961 | Auxier et al. | 313/93 |
| 3,174,042 | 3/1965 | White | 250/388 |
| 3,372,295 | 3/1968 | Sparks | 313/93 |
| 3,614,442 | 10/1971 | Brodsky | 250/388 |
| 4,178,509 | 12/1979 | More et al. | 250/374 |
| 4,191,886 | 3/1980 | Basso et al. | 250/376 |

FOREIGN PATENT DOCUMENTS

| | | |
|---|---|---|
| 1104081 | 9/1957 | Fed. Rep. of Germany . |
| 1032431 | 6/1958 | Fed. Rep. of Germany . |
| 1063288 | 10/1959 | Fed. Rep. of Germany . |
| 1179307 | 10/1964 | Fed. Rep. of Germany . |
| 1205629 | 11/1965 | Fed. Rep. of Germany . |
| 1180071 | 5/1966 | Fed. Rep. of Germany . |
| 1614913 | 2/1967 | Fed. Rep. of Germany . |
| 1589515 | 2/1970 | Fed. Rep. of Germany . |
| 2163887 | 5/1974 | Fed. Rep. of Germany . |
| 2534710 | 2/1977 | Fed. Rep. of Germany . |
| 2931666 | 2/1981 | Fed. Rep. of Germany . |
| 3100447 | 2/1983 | Fed. Rep. of Germany . |
| 31826 | 9/1964 | German Democratic Rep. . |
| 73584 | 6/1970 | German Democratic Rep. . |

OTHER PUBLICATIONS

Korff, "Electron and Nuclear Counters: Theory and Use" Van Nostrand Co., N.Y., 1955, pp. 206–209.
Zaubitzer, "Feinwerktechnik", 8, 1957, pp. 276–277.
"Mini Monitor", Trade brochure, undated.

Primary Examiner—Alfred E. Smith
Assistant Examiner—Carolyn E. Fields
Attorney, Agent, or Firm—Frishauf, Holtz, Goodman & Woodward

[57] ABSTRACT

A highly sensitive and compactly structured radiation measuring instrument for detecting ionizing radiation, in particular for measuring dose rates and contamination.

The laminar structure of the associated counter tube, using only a few, simple plastic parts (1, 8, 9) and a highly elastic counter wire (2), makes it possible to use the simplest manufacturing techniques. The service life of the counter tube construction, which is completely and permanently sealed and filled with gas, is expected to be more than 12 years.

The described counter tube can be adapted in optimal fashion to the available space in a pocket instrument if it is used in combination with a specialized high-voltage generator which is low in interference voltage and with a pulse evaluation circuit having a means of compensating for interference voltage.

14 Claims, 8 Drawing Figures

RADIATION MEASURING INSTRUMENT

This application corresponds to German patent DE No. 31 00 447 C2, issued Feb. 24, 1983.

The invention relates to a radiation measuring instrument for detecting ionizing radiation.

The novel instrument should have high sensitivity to beta, gamma, X and neutron radiation, for instance, so that it will be suitable as a contamination measuring instrument for traces of weakly radioactive contamination. Its simple, sturdy and compact construction should suit it for use as a universal radiation warning device. It should be possible to manufacture and adjust the instrument according to the invention with high accuracy, and to produce it simply and inexpensively.

BACKGROUND

Pocket-sized counter tube instruments for detecting radioactivity are known. However, the miniature Geiger counters presently available are not very sensitive and are therefore not suited to the detection of slightly radioactive contamination in the environment. Specialized contamination monitors are generally used for that purpose, being equipped with special, highly sensitive counter tubes. The construction of such instruments, however, is so expensive that there could be no question of their use except by professionals because of the high cost involved. The basic situation thus described above in general will now be discussed in greater detail.

Some of the requirements to be made of a reliable radiation measuring instrument are set forth in the DIN 6818 and DIN 44 801 standards. It must furthermore be noted that a hand instrument for measuring contamination in the lowdose range must have a certain minimum sensitivity, so that a brief and/or slight increase in the counting rate above the average background level occurring in the course of a scanning movement can also in fact be recognized by the user of the device.

In practice, the only suitable contamination measuring devices have been those which respond to the natural background level of approximately 10 microrem per hour with a counting rate of $1\ s^{-1}$ or more. At low counting rates, it is extremely difficult to detect variations in the counting rate directly, regardless of the manner in which the counting rate is registered or displayed. When this is done using an indicator instrument, then even when the maximum permissible time constant of 4 s (DIN 44 801) is used, the reading accuracy at low counting rates is insufficient. Optical or acoustical single-pulse registration produces no better results, because the human organism is not capable of perceiving with sufficient accuracy stochastic events which elapse slowly.

From the above discussion it will be understood that the low-voltage counter tubes having a noble-gas/halogen atmosphere presently available and of standard design, and in particular the miniature versions, cannot be considered appropriate for the construction of an efficient radiation measuring device suitable for measuring contamination, because the sensitivity of such standard detectors is insufficient for reliably detecting weak radiation.

In recognition of this fact, the use of proportional counter tubes of large surface area was advocated at quite an early date. Proportional counter tubes are known which have been optimized, at relatively great expense, in the direction of maximum possible sensitivity and which are designed as measuring instruments for alpha and beta radiation, being particularly in the form of liquid flow counters having thin-walled windows. Window-type counter tubes of this kind must, because of their construction, all be operated with a constant high voltage of several kilovolts, and therein lies one of the primary difficulties in the miniaturization of highly sensitive radiation measuring instruments.

Portable embodiments having a built-in, large-surface proportional counter tube are also known, which are commercially available as workplace monitors in order to satisfy the requirements of Article 64 of the Radiation Protection Regulations of the Federal Republic of Germany. Given the considerable expense of these instruments, their structural volume of more than 2 $dm^3$ and a weight of more than 1 kg, such devices are used practically only in connection with the handling of radioactive substances requiring official permission according to Article 3 of the Radiation Protection Regulations of the Federal Republic of Germany. Universally useable pocket instruments having large-surface proportional counter tubes have not heretofore been known. The only pocket instruments known for this purpose have been those with Geiger-Miller counter tubes, particularly counter tubes of the low-voltage type and of classic design.

THE INVENTION

It is the object of the invention to disclose a reliably functioning radiation measuring instrument usable as a radiation-protection dosimeter, which although of small dimensions and having low current consumption has a high response capacity for weak radiation, and the construction of which is so simple and sturdy that the instrument can be made available to a wide range of users.

Briefly the counter tube is made up substantially of only a few—that is, two or three—simple plastic parts laminated together and a highly elastic counter wire, and that associated with the counter-tube construction, directly adjacent, are a low-interference high-voltage generator (which operates at low current consumption) for generating the supply voltage for the counter tube, which operates in the proportional range, and a pulse evaluation circuit having an (adjustable) means of interference-voltage compensation.

As a result of the combination of the three characteristics according to the invention, it is possible, using simple manufacturing techniques, to construct a reliably functioning radiation measuring instrument as a pocket device and to equip it with a highly sensitive large-surface proportional counter tube although the latter requires a high voltage of several kilovolts. The counter tube, the high-voltage generator and the pulse evaluation means, in particular, are disposed quite compactly adjacent to one another in the exemplary embodiment which will be described below, without taking expensive measures to provide shielding, and are accommodated together in a plastic housing of small dimensions.

A problem in such arrangements is the attainment of a sufficient interference-voltage interval between the pulses to be picked up at the counter wire and the interference pulses from the high-voltage generator injected into the evaluation circuit via stray capacitances. While in conventional counter tubes of the Geiger-Miller type, in particular in low-voltage halogen counter tubes, the level of the emitted pulses is approximately $10^{-2}$ to $10^{-1}$ of the supply voltage, these conditions are substantially less favorable in counter tubes operated in the proportional region. In that case, a peak pulse voltage must be expected which is in the range from $10^{-6}$ to $10^{-4}$ of the supply voltage.

For safety reasons, it is required that the interference-voltage interval in the signal processing be at least 20 dB below the smallest useful signal to be taken into consideration in the evaluation; this means that in constructing instruments having proportional counter tubes, interference-voltage intervals in the range from $-140$ dB to $-100$ dB, with respect to the peak voltage of the high-voltage generator, must be achieved. The working frequency then is conventionally a few kilohertz. These unfavorable conditions represent the primary reason why proportional counter tubes operating with high voltage could not previously be incorporated into instruments of genuinely pocket size.

THE DRAWINGS

The realization of the three characteristics according to the invention will now be described in greater detail. One possible form of embodiment of the radiation measuring instrument according to the invention is shown in the drawings. Shown are.

DETAILED DESCRIPTION

Figure 1:
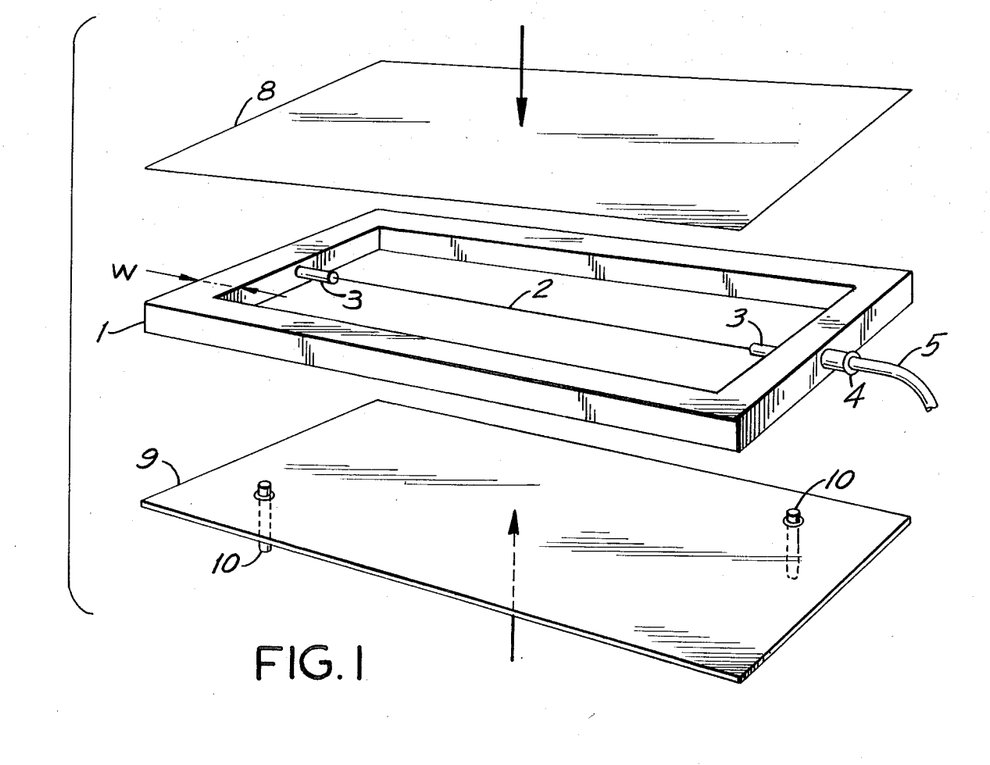
FIG. 1, the laminated construction of the counter tube, seen in a perspective illustration.

All the above-mentioned requirements are satisfied in accordance with the invention by means of a counter-tube construction in which the counter tube substantially comprises three plate-like or foil-like plastic parts, for instance laminated by means of an adhesive, and one counter wire. FIG. 1 shows how these elements are combined in a laminated design. Specifically shown are: a window 8 in the form of a simple, perhaps rectangular, blank of a thin-walled, glass-fiber-reinforced metal/-plastic laminate; a frame-like middle part 1, for instance in the form of a plastic plate provided with a central cutout; a base 9 in the form of a simple, perhaps rectangular, blank of some arbitrary metal/plastic laminate; and a metal wire 2 of high elasticity which is fastened in the middle part 1. FIG. 1 further shows two insulating sleeves 3 of polytetrafluoroethylene (Teflon), a tubular rivet 4 for shielding the cable connection, a coaxial cable 5 for conducting the pulses and two filler fittings 10 of copper tubing.

The exemplary instrument shown in the drawings has a plastic housing the outer dimensions of $155 \times 72 \times 42$ mm. The outer dimensions of the frame-like middle part 1 are $127 \times 60$ mm. The wall thickness W is 10 mm. The counter tube structure completely fills the flat side of the housing.

In order to fabricate the window 8 and the base 9, copper-lined glass-fiber/epoxy laminate can be used, of a quality such as is available on the market as the basic material for printed circuits, down to surface densities of 50 mg/cm$^2$. The window and the base can be glued to the frame-like middle part in such a way that each of the metal layers faces inward. The metal coatings serve as cathode surfaces.

The counter wire 2 used as an anode is fastened precisely in the center between the cathode surfaces. Both the counter wire itself and the accessory materials serving to fasten it can be effectively shielded with simple means because of the laminated design.

Figure 8:
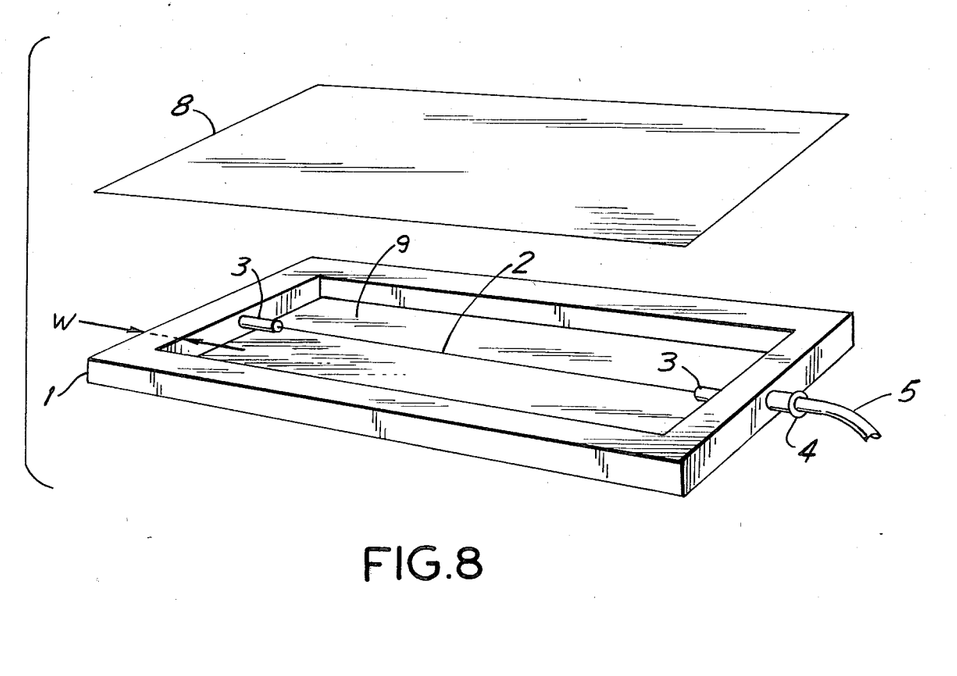
FIG. 8, a perspective illustration similar to FIG. 1, of the alternate embodiment of claims 3, 13, and 14.

In high-quantity production, it may be efficacious to fabricate the middle part 1 and the base 9 in one piece, for instance by injection molding, making a subcomponent 1+9 (FIG. 8). On the base of the plastic half-shell thus created, a metal coating is made by lamination or by vapor-depositing in a vacuum. Otherwise, this variant does not differ from the description given earlier.

In accordance with the invention, either polyvinyl chloride, polyvinylidene chloride, polyvinylidene fluoride or a mixed polymer of these components, free of softening agents, is used for the middle part 1 of the above-described construction. These materials lend themselves well to both chip-producing and thermoplastic processing, and when epoxyresin adhesives are used, they result in good bonds with the above-mentioned copper-lined plates. These materials furthermore have the particular advantage, because of their highly polar molecular structure, that the nonpolar counter gas to be described below penetrates them to only a very limited extent.

However, there is considerable prejudice against the use of plastic materials in the construction of counter tubes having a sealed gas chamber. The primary reason is that experience has shown that such materials, over a rather long period, give off residual gases and are furthermore not usually entirely impermeable to the counter gas.

There has been some experience with polymethylmethacrylate (Plexiglas) and polyethylene materials, to the extent that these materials have been used in the construction of recoil proton counters. Whenever such constructions have been provided with a sealed gas chamber for the sake of longer life, they are usually additionally sealed hermetically by enclosures made of thin metal sheets or metal foils.

The use of polymethylmethacrylate (Plexiglas) in counter tubes having a sealed gas chamber is problematical, because this material produces particularly high quantities of residual gases, and these gases are predominantly made up of water vapor. Thus within a short time, water vapor partial pressures of more than 1 torr can arise within the counter tube. Yet just such molecules, like H$_2$O and O$_2$, which can form slightly negative ions, present substantial interference even in trace quantities. Such a phenomenon would have particular impact on the counter tube construction according to the invention, because the geometry of the electrical field in the invention is less favorable than in the conventional design, which has a radially symmetrical field.

Nor can the use of polyethylene, polypropylene or similarly structured polymers be considered possible for the construction according to the invention, because such materials can be processed satisfactorily only with adhesive systems which contain solvents. Aside from the poor adhesion to metal surfaces in such a case, a very pronounced emission of gas from the glued joint would then have to be expected. Because of the close chemical relationship between these last-named polymers and the counter gas to be described below, it must furthermore be expected that the gas will be highly soluble in the wall material. The coefficient of thermal expansion of the polyethylene is approximately twice that of the material according to the invention. This material characteristic has particular significance for the construction described herein.

Nor can the material preferred for vacuum-type applications, polytetrafluoroetylene (Teflon), or the chemically closely related fluorohydrocarbons be used, because of the particular difficulties associated with adhesion in producing the middle or lower part of the structure.

When polyvinyl chloride or similar materials are used, the use of copper in the interior of the counter tube offers a particular advantage: The partially oxidized surface of this metal chemically binds any slight residual gas quantities which may arise, especially the primary interference factors $H_2O$ and $O_2$ and perhaps HCl or HF as well, very firmly and thus renders them harmless. This mechanism is important, if despite the use of plastic materials it is necessary to attain long service life on the part of the counter tubes.

Figure 2:
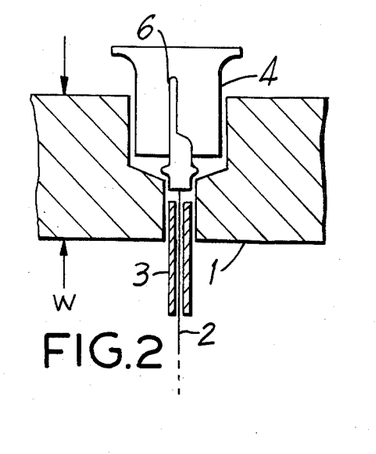
FIG. 2, a section taken through the front holding device for the counter wire.
Figure 3:
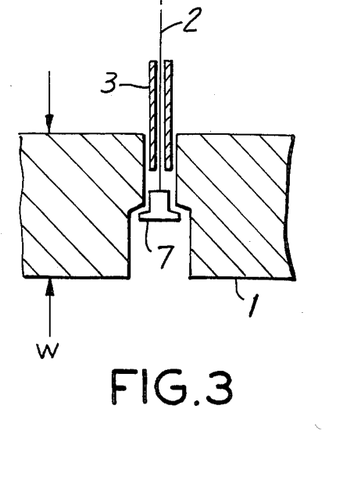
FIG. 3, a section taken through the rear holding device for the counter wire.

FIGS. 2 and 3, in a horizontal section seen on an enlarged scale, show the accessory means with which the counter wire 2 is fastened within the middle part 1. A soldered sheath 6 is located at the front end of the counter wire and serves to connect the counter wire 2 to the coaxial cable 5. A small tubular rivet 7 serves as the rear termination of the counter wire 2. The counter wire 2 is soldered to the metal parts 6 and 7 with a specific initial stress. The two fastening devices shown in FIGS. 2 and 3 for the counter wire are sealed off by being plugged with epoxy resin.

Previously, it was generally the practice to maintain the mechanical tension of the counter wire permanently by means of a spiral spring disposed in the counter tube. If in order to save space or for the sake of economical manufacture a tension spring must be dispensed with, then even greater demands are made on the material properties of the counter wire, so that this wire will remain under tension under all operating conditions.

A further embodiment of the invention offers a satisfactory solution to this problem, by providing that in counter tubes made up of plastic materials without spiral springs, alloys are used which unite in themselves the characteristics of a high heat-expansion coefficient, a low modulus of elasticity, a wide range of fully-elastic deformability, high tensile strength and good solderability. According to the invention, a hardened gold-silver-copper alloy having a composition of 70% Au, 20% Ag and 10% Cu or else the hardened resistance alloy, manganin, having the short formula, CuMn12Ni, according to DIN 17 471 can be used in counter tube constructions of plastic.

The conventional materials for counter wires, such as tungsten, platinum, chromic iron and others, fail in constructions of plastic, because in the course of temperature cycles either the wire tears or an irreversible deformation of the wire or of the middle part or lower part serving to fasten it occurs. Good solderability is likewise advantaqeous in constructions of plastic materials.

As the counter gas, highly-purified n-butane or highly-purified iso-butane is preferably introduced into the gas chamber of the counter tube. These gases are inert over long periods in the presence of all the materials which are in contact with the gas chamber, in particular in the presence of polyvinyl chloride and chemically similar polymers, cured epoxy resins, copper, tetrafluoroethene, the gold-silver-copper alloy mentioned above, the resistance alloy, manga-nin, and the flux-free soldering tin used in soldering. The high molecular weight of the proposed gas furthermore has a favorable effect in terms of lower speeds of diffusion. Because of the high proportion of hydrogen atoms in the butane molecule, a special feature is also the possibility of detecting fast neutrons with the counter tube.

Figure 4:
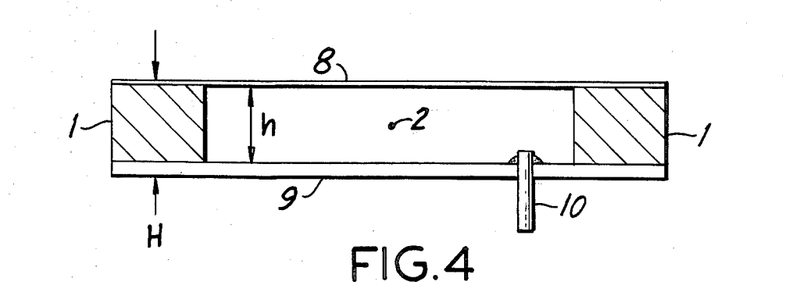
FIG. 4, a cross section taken through the counter tube.

FIG. 4 shows a cross section taken through the counter tube construction. In the sample instrument on which the drawings are based, the internal height h of the gas chamber is 8 mm and the total height H of the structure is 10 mm.

Figure 5:
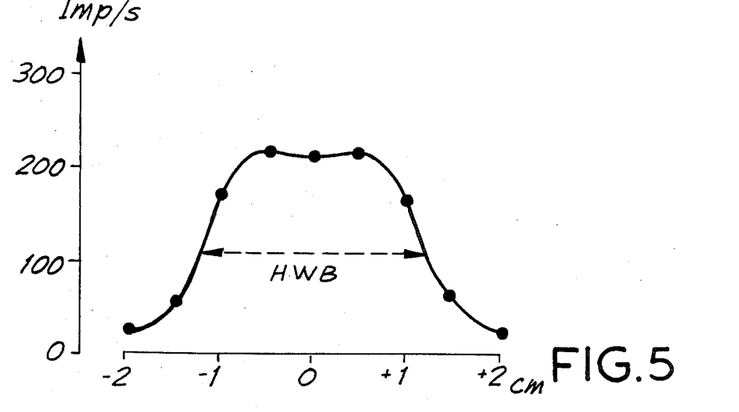
FIG. 5, the distribution of the response sensitivity over the cross section of the counter tube.

FIG. 5 shows the distribution of response sensitivity of the counter tube over the cross section of FIG. 4. Measurement was performed with the mixed radiation of natural uranium, screened down to a 5 mm width. The supply voltage of the counter tube for this measurement is 3200 V, and the discriminator threshold is 100 mV. The effectively useful width of the counter tube, measured as a half-width value HWB, amounts to approximately 2.5 cm.

Figure 6:
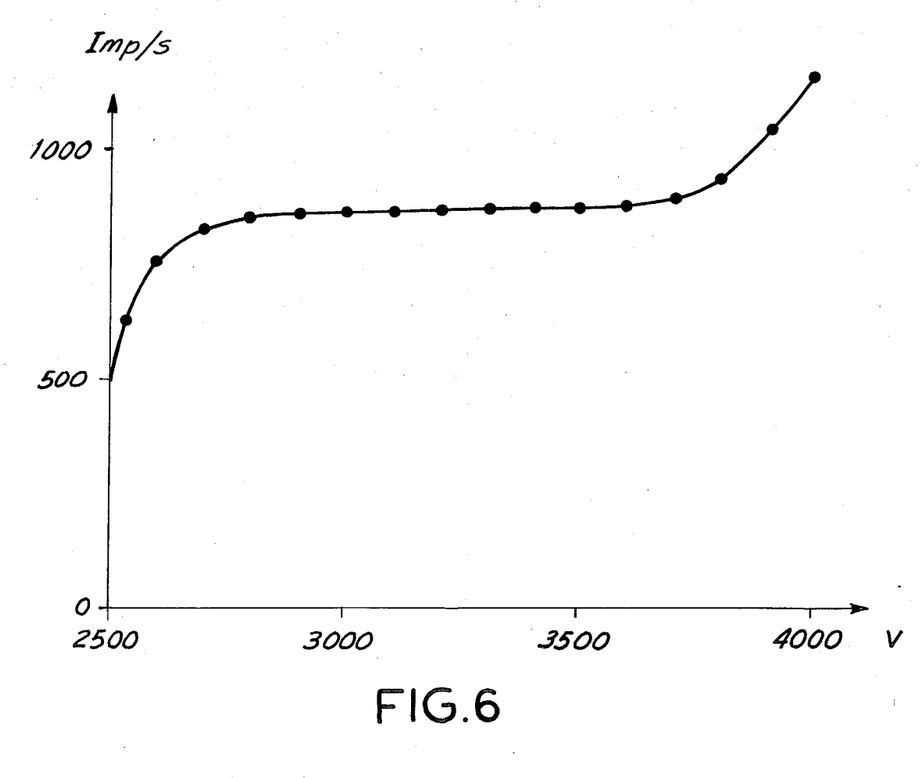
FIG. 6, the characteristic of the counter tube.

FIG. 6 shows the complete characteristic curve of the preferred form of the counter tube, which is the form described above. The characteristic curve applies to the radiation of natural uranium distributed uniformly over the total window surface area. The discriminator threshold is 100 mV. In the vicinity of the plateau, a constant counting rate is obtained over a range of 800 V. In aging experiments performed at an elevated temperature, which was the equivalent of an elapse of three years, no substantial changes in the counter tube characteristic could be ascertained.

Further data for the sample counter tube in the preferred form of embodiment:

Background level (without shielding): ca. 1.2 pulses per second.

Counting rate at a dose rate of 1 mR/h: ca. 120 pulses per second.

In summary, it can be said that the construction of the counter tube according to the invention satisfies quite various criteria. Although the window surface area is large, a low structural height is attained, so that the counter tube and the electronics can be accommodated above one another in a flat housing. For the window material, a material is used which on the one hand has good permeability to beta radiation because of its low surface density and furthermore, because of its composition, has a low wave-length dependency in the absorption of photon radiation, yet on the other hand has sufficient mechanical stability that the window need not be protected against destruction by any specialized accessory structures such as protective screens or the like. Without such accessory structures, the decontamination of the measuring instrument becomes much easier.

With a view to the sensitivity to gamma radiation and also the long-term stability of the counter tube characteristic, the fact that the interior of the counter tube is to a large extent defined by metal walls has a favorable effect. Walls of plastic materials are relatively thick, so that gas diffusion processes directed either inward or outward remain within harmless limits.

Finally, the laminated structure also takes appropriate consideration of the above-discussed problem of the interference-voltage interval. Given the illustrated shaping of the cathode faces, good shielding is provided for the counter wire itself, for its holders at either side and for the cable connection for the pickup of the pulses.

All the parts of the counter tube construction are distinguished by simplicity of shape and are available on the market as ready-made parts. It is thus possible to produce the counter tubes economically and at a favorable cost. The construction is sturdy and is not vulnerable to the mechanical stresses to which a universal radiation warning device may be exposed.

If the counter tubes must be used in the range of relatively high dose rates, and if the conventional service life limit of from $10^{10}$ to $10^{12}$ pulses is attained in counter tubes filled with gas which irreversibly decomposes, then in accordance with a further embodiment of the invention a particular purification principle can be applied: By introducing absorbents such as activated carbon, silica gel, aluminum oxide, magnesium oxide or the like into the sealed gas chamber, the harmful effect of the products of decomposition formed in the discharging process can be reduced, and the service life of the counter tubes exposed to strong radiation can be increased.

Further characteristics of the invention relate to the embodiment of the electronic components. In terms of the electronics, special conditions apply to a radiation measuring instrument of pocket size. Conventional circuit techniques cannot be used without adaptation, because the spatial closeness of the high-voltage generation and the pulse evaluation to one another leads to the above-discussed problems of interference voltage. In a simple pocket device, a complete shielding of the individual components in separate metal housings is not possible, because of the additional space required and the increased weight. In pocket devices, not only is a specialized embodiment of the counter tube construction required, for instance in the form of a laminated structure, but a high-voltage generator which is particularly low in interference voltage is necessary; it is also advantageous to provide a separate, adjustable means of compensating for interference voltage.

Figure 7:
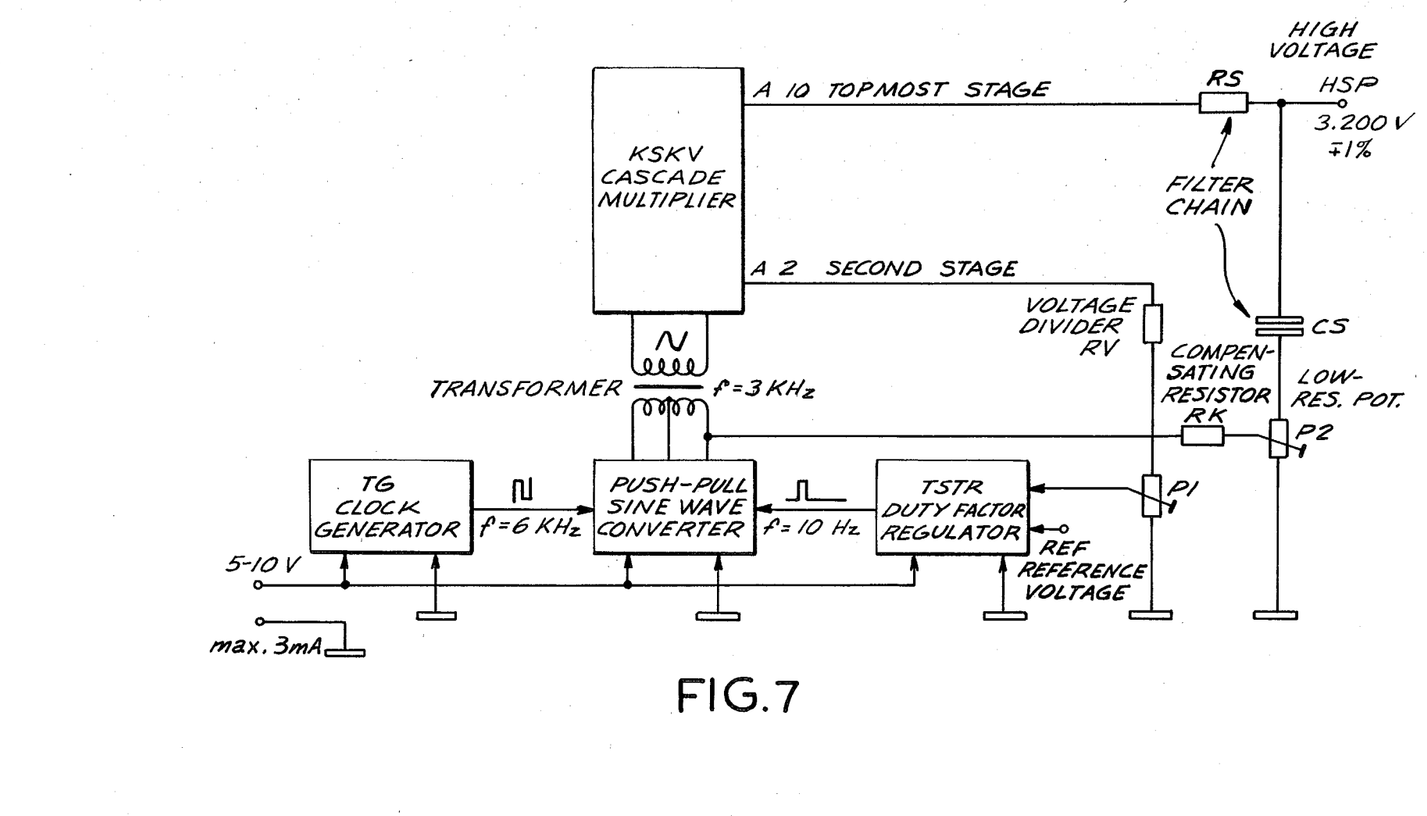
FIG. 7, a block circuit diagram of the high-voltage generator and of the interference-voltage compensation means.

FIG. 7 provides a block circuit diagram for the high-voltage generator according to the invention and for the associated means of interference-voltage compensation acting upon the pulse evaluation circuit. FIG. 7 is explained as follows:

A push-pull sine wave converter GTSW is triggered continuously by a clock generator TG. The operating voltage is applied to the push-pull sine wave converter, however, only when the duty factor regulator TSTR generates a corresponding enabling signal. The enabling signals are generated whenever the counter tube operating voltage has fallen below a predetermined value. This is ascertained by the comparison of an actual signal, picked up from the second stage A2 of the cascade multiplier KSKV via a voltage divider RV, P1, with a reference voltage REF.

The high voltage HSP is drawn from the topmost stage A10 of the cascade multiplier via a filter chain RS, CS. A low-resistance potentiometer P2 is incorporated at the bottom of the filter chain RS, CS, by way of which a predetermined component of the signal generated by the push-pull sine wave converter is coupled in via a compensating resistor RK in order to compensate for interference voltage.

The purpose of compensating for interference voltage is not to attain a complete smoothing of the high voltage, but rather to balance the potentiometer P2 such that the maximum possible interference-voltage interval is provided in the circuitry intended for the amplification and evaluation of the counter tube pulses. This is the case, for instance, if the interference-voltage portion primarily caused by the components of the cascade multiplier KSKV and injected into the evaluation circuit is neutralized, in a correctly phased manner and with the required amplitude, by means of the compensation signal which is superimposed on the high voltage and conducted via the counter tube capacitance to the evaluation circuit. The amplification and evaluation of the pulses may be accomplished with any conventional means.

In accordance with the invention, a substantial reduction in the interference radiation emitted by the high-voltage generator is attained in that the direct-voltage converter is designed not as a blocking converter in the conventional manner, but rather as a push-pull sine wave converter generating signals having a low harmonic content. This is an unusual provision for a battery-operated device, because a converter of this kind has a relatively high current consumption, even with a low secondary load. However, this current consumption is reduced by more than a factor of 10 in accordance with a further provision of the invention, by designing the regulator for keeping the high voltage constant as a duty factor regulator. In accordance with the control signals of the duty factor regulator, the push-pull sine wave converter need not function continuously, but is switched on and off periodically instead, with a duty factor such as is required for maintaining the counter tube operating voltage. The converter can be switched on and off with high efficiency if the converter is triggered by a clock generator having a doubled working frequency.

A further distinction of the invention is that the improvement in the ratio of the useful signal to the interference signal is attained in that a compensation signal which can be adjusted in its amplitude is injected into the filter chain of the high-voltage generator; the compensation signal can be drawn from the push-pull sine wave converter. A compensation of this type can be optimally adjusted only if the interference signal to be suppressed is as low in harmonics as is the case with the push-pull sine wave converter, and if the interference-voltage component is accordingly substantially identical in frequency and phase relation with the signal emitted by the push-pull sine wave converter.

The high-voltage generator of the sample instrument is made up of CMOS gates and standard operational amplifiers, and at input voltages of 5 to 10 V it produces a high voltage, stabilized to within ±1%, of 3200 V. The current consumption at maximum is 3 mA. After the instrument has been switched on, the high voltage is stable at 3200 V within 2 seconds.

In connection with the described invention, a particularly simple method for filling the counter tube with counter gas is also disclosed. The filling of the counter tube is effected in connection with a specialized flushing and aging process, which represents the foundation for great long-term stability of the counter tube characteristic and is distinguished by a low labor cost. The fill pressure used is approximately equivalent to atmospheric pressure.

Preferably all the counter tubes of one production batch, after being glued, are connected in a series with one another via the fill fittings 10 provided at the inlet and outlet sides; at an elevated temperature, they are first flushed for a sufficiently long period with dried air and then with industrially pure argon, and finally with highly purified butane at a slow flow rate and are thereby aged. After the flushing and aging process, the counter tubes are removed, one after another, without interrupting the circulation of gas. As the individual counter tubes are removed, the fill fittings 10 (FIG. 1), which are of thin copper, are pressed together and soldered.

I claim:

1. A pocket-size radiation measuring instrument for detecting ionizing beta, gamma, and neutron radiaion, which as its detector has
    a large-surface window-type counter tube suitable for measuring contamination with a completely and permanently sealed gas chamber, as well as
    a counter gas in said gas chamber,
    an anode and a cathode,
    a high voltage (multiple kilovolt) generator (HSP) connected to said anode and cathode,
wherein, in accordance with the invention,
    the counter tube structure substantially comprises no more than three simple plastic parts (1, 8, 9), namely
    a substantially planar window (8), a substantially planar base (9), and a frame-like hollow middle part (1), sandwiched between and sealed at its periphery to said window and base (9),
    at least one of said window and said base having a metal coating thereon which serves as the cathode for said counter tube, and
    a highly elastic counter wire (2) supported under tension within said hollow middle part (1) and serving as the anode for said counter tube.

2. A radiation measuring instrument as defined by claim 1, characterized in that the counter tube substantially comprises three plate-like or foil-like plastic parts bonded together by adhesive or by welding techniques and a counter wire, more specifically a window (8) in the form of a blank of simple shape cut from a thin-walled, glass-fiber-reinforced metal/plastic laminate, a frame-like middle part (1) in the form of a plastic plate provided with a central cutout, a base (9) in the form of a simply shaped blank of some arbitrary metal/plastic laminate and a thin metal wire (2) having high elasticity which is fastened in the middle part (1).

3. A radiation measuring instrument as defined by claim 2, characterized in that the plastic parts defining the gas chamber of the counter tube are made exclusively of the materials, free of softening agents, of polyvinyl chloride, polyvinylidene chloride, polyvinylidene fluoride or a mixed polymer of these components, that the adhesive is a two-component epoxy resin, that the metal coating is of copper, and that the filling gas comprises a nonpolar gas of the aliphatic series.

4. A radiation measuring instrument as defined by claim 2, characterized in that
    absorbent materials, which are inert in the presence of the counter gas, selected from the group consisting of activated carbon, silica gel, aluminum oxide, and magnesium oxide, are accomodated inside the sealed gas chamber for the absorption of the products of decomposition produced by electrical discharges between said anode and cathode.

5. A radiation measuring instrument as defined by claim 1, characterized in that the counter tube structure substantially comprises two simple plastic parts, bonded together by adhesive or by welding techniques, and a counter wire, more specifically a window (8) in the form of a blank of simple shape cut from a thin-walled, glass-fiber-reinforced metal/plastic laminate, a flat, plastic lower part having a flat base and an upper peripheral rim (1+9) produced by injection molding or deep drawing, to the base of which a metal coating is applied, and a thin metal wire (2) having high elasticity which is fastened in the lower part.

6. A radiation measuring instrument as defined by claim 1 characterized in that the material comprising the counter wire (2) is a hardened gold-silver-copper alloy having a composition of 70% Au, 20% Ag and 10% Cu or the hardened resistance alloy, manganin, having the short formula of CuMn12Ni as defined by DIN 17 471.

7. A counter tube for detecting ionizing radiation, which comprises essentially three plastic counter tube elements, namely a window (8), a middle part (1), and a substantially planar base (9), and an elastic counter wire (2),
    said window and said base each having a conductive layer on the surface facing the other,
    wherein, in accordance with the invention,
    said middle part (1) comprises a material selected from the group consisting of polyvinylchloride, polyvinylidene fluoride, and a mixed polymer of polyvinylchloride and polyvinylidene fluoride;
    said conductive surface layer of said window (8) and base (9) comprises copper; and
    said window (8), middle part (1), and base (9) are hermetically sealed together to form a gas chamber, and
    said gas chamber is filled with a butane counter gas.

8. A counter tube as defined by claim 7, wherein
    the window (8) and base (9) are formed as simple rectangular blanks of a thin-walled, glass-fiber-reinforced copper/plastic laminate, and
    said middle part (1) is formed as a frame-like plastic plate provided with a central cutout.

9. A counter tube as defined in claim 7, characterized in that the middle part (1) and the base (9) are formed as one integral piece by injection molding.

10. A counter tube as defined in claim 7, characterized in that the middle part (1) and the base (9) are formed as one integral piece by extrusion.

11. A counter tube as defined in claim 7, wherein said sealed gas chamber contains, in addition to the counter gas, an absorber material for absorbing breakdown products resulting from electric discharges in said counter gas.

12. A counter tube as defined in claim 11, wherein said absorber is a material selected from the group consisting of activated charcoal, silica gel, aluminum oxide, and magnesium oxide.

13. A counter tube as defined in claim 7, wherein said counter wire (2) and said conductive surface layer serve as the anode and the cathode, respectively, of the counter tube and are adapted for connection to a high-voltage supply.

14. A counter tube as defined in claim 7, wherein said counter wire (2) is stretched across said middle part (1) substantially parallel to said window (8).

* * * * *